(12) United States Patent  
Cham et al.

(10) Patent No.: US 8,175,165 B2  
(45) Date of Patent: *May 8, 2012

(54) METHODS AND APPARATUS FOR DERIVING AN ORDER-16 INTEGER TRANSFORM

(75) Inventors: Wai Kuen Cham, Hong Kong (CN); Chi Keung Fong, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 1058 days.

This patent is subject to a terminal disclaimer.

(21) Appl. No.: 12/103,676

(22) Filed: Apr. 15, 2008

(65) Prior Publication Data

US 2009/0257504 A1    Oct. 15, 2009

(51) Int. Cl.  
*H04B 1/06* (2006.01)

(52) U.S. Cl. .............................. 375/240.18; 375/240.03

(58) Field of Classification Search .................. 370/240, 370/240.03, 240.18; 708/400, 401, 505, 708/514, 670  
See application file for complete search history.

(56) References Cited

U.S. PATENT DOCUMENTS

| | | | |
|---|---|---|---|
| 5,894,430 A | 4/1999 | Ohara | |
| 6,397,235 B1 | 5/2002 | Van Eijndhoven et al. | |
| 2007/0223590 A1 | 9/2007 | Ma | |
| 2009/0112958 A1* | 4/2009 | Cham et al. ................... | 708/400 |
| 2009/0141796 A1* | 6/2009 | Cham et al. .............. | 375/240.03 |
| 2009/0257505 A1* | 10/2009 | Cham ....................... | 375/240.18 |

FOREIGN PATENT DOCUMENTS

| | | |
|---|---|---|
| CN | 1455599 A | 11/2003 |
| CN | 1642280 A | 7/2005 |
| CN | 1695382 A | 11/2005 |
| CN | 1860795 A | 11/2006 |
| CN | 1980396 A | 6/2007 |

OTHER PUBLICATIONS

Siwei Ma et al.; "High-definition Video Coding with Super-macroblocks;" Ming-Hsieh Department of Electrical Engineering and Integrated Media Systems Center University of Southern California, LA, CA 90089-2564, USA; SPIE-IS&T/vol. 6508/16; pp. 1-12 (2007).

(Continued)

*Primary Examiner* — Hanh Nguyen  
(74) *Attorney, Agent, or Firm* — Fish & Richardson P.C.

(57) ABSTRACT

Apparatus, systems and techniques based on an integer transform for encoding and decoding video or image signals, including an order-16 integer transform from a Microsoft Media Video order-8 integer transform with a high energy-packing ability and an improved data compression in the field of image and video coding. For example, a method and an apparatus are provided for deriving an order-16 integer transform from an order-8 integer transform in the standard transform of Microsoft Media Video. Eight additions and eight subtractions are used to assign the data elements to be transformed to an intermediate matrix; and then two fast algorithms for the computation of the order-8 transform may be applied to the first 8 vectors of the intermediate matrix, and the last 8 vectors of the intermediate matrix, respectively. The derived order-16 integer transform tends to produce small magnitude and high frequency transformed coefficients, and thus achieve high compressibility.

26 Claims, 4 Drawing Sheets

OTHER PUBLICATIONS

Patent Examiner David H. Malzahn, Office Action in U.S. Appl. No. 12/100,358 mailed Sep. 22, 2011, 8 pages.

Detlev Marpe, et al., IEEE Communications Magazine, "The H.264/MPEG4 Advanced Video Coding Standard and its Applications", Aug. 2006, pp. 134-143.

Iain E G Richardson, "H.264/MPEG-4 Part 10 White Paper" [online], [retrieved on Jul. 10, 2002]. Retrieved from the Internet: <www.vcodex.com>.

Thomas Weigand et al., "Draft ITU-T Recommendation and Final Draft International Standard of Joint Video Specification (ITU-T Rec. H. ISO/IEC | 14496-10 AVC)" Joint Video Team (JVT) of ISO/IEC MPEG & ITU-T VCEG (ISO/IEC JTC1/SC29/WG11 and ITU-T SG16 Q.6) 8th Meeting: Geneva, Switzerland, May 23-27, 2003.

U.S. Appl. No. 12/103,678, filed Apr. 15, 2008, 26 pages.

\* cited by examiner

METHODS AND APPARATUS FOR DERIVING AN ORDER-16 INTEGER TRANSFORM

BACKGROUND

This application relates to digital image and video processing.

Various applications exist for digital video communication and storage, and corresponding international standards have been and are continuing to be developed. To achieve low bit rate communications, MPEG-2, MPEG-4 Part 2, and H.263 standards divide a picture into 16×16 non-overlapping blocks called macro block and then use 2 dimensional (2D) order-8 discrete cosine transform (DCT) in digital video compression algorithms used in the coding standards. Recently, new video coding standards, such as H.264/AVC, AVS and SMPTE 421M etc, have been proposed that use 2D order-4 or order-8 transforms to provide a better compressibility than the video standards based on the 2D order-8 DCT. In those standards, the 2D order-4 or order-8 transforms are used so as to seek a trade-off between computational efficiency and coding efficiency.

SUMMARY

This application describes examples and implementations of apparatus, systems and techniques based on an integer transform for encoding and decoding video or image signals, including an order-16 integer transform from a Microsoft Media Video order-8 integer transform with a high energy-packing ability and an improved data compression in the field of image and video coding.

In one aspect, a process for deriving an order-16 integer transform from an order-8 integer transform in image and video coding includes:

retrieving a data matrix $X_{16 \times 16}$ to be transformed;

assigning the retrieved matrix $X_{16 \times 16}$ to an intermediate matrix $C_{16 \times 16}$ by eight additions and eight subtractions; and deriving a resultant matrix $Z_{16 \times 16}$ by carrying out the order-8 integer transform twice by a rule of $$[z_{0,m} z_{1,m} \ldots z_{7,m}]^T = E_{8 \times 8} [c_{0,m} c_{1,m} \ldots c_{7,m}]^T$$

$$[z_{8,m} z_{9,m} \ldots z_{15,m}]^T = E_{8 \times 8} [c_{8,m} c_{9,m} \ldots c_{15,m}]^T$$

wherein $z_{n,m}$ is of the (n,m)th element of the matrix $Z_{16 \times 16}$, and $E_{8 \times 8}$ is a standard order-8 transform used in the standard of Microsoft Media Video.

In another aspect, an apparatus for deriving an order-16 integer transform from an order-8 integer transform in image and video coding includes:

an assignment unit configured to retrieve a data matrix $X_{16 \times 16}$ to be transformed, and then to assign the retrieved matrix $X_{16 \times 16}$ to an intermediate matrix $C_{16 \times 16}$ by eight additions and eight subtractions; and a transform unit configured to derive a resultant matrix $Z_{16 \times 16}$ by carrying out the order-8 integer transform twice by a rule of $$[z_{0,m} z_{1,m} \ldots z_{7,m}]^T = E_{8 \times 8} [c_{0,m} c_{1,m} \ldots c_{7,m}]^T$$

$$[z_{8,m} z_{9,m} \ldots z_{15,m}]^T = E_{8 \times 8} [c_{8,m} c_{9,m} \ldots c_{15,m}]^T$$

wherein $z_{n,m}$ is of the (n,m)th element of the matrix $Z_{16 \times 16}$, and $E_{8 \times 8}$ is a standard order-8 transform used in the standard of Microsoft Media Video.

In some implementations, only additions and subtraction operations are performed in the processing. Hence, if an order-8 transform is an integer transform, the resultant order-16 integer transform is also an integer transform and thus can be easily implemented with good precision if the integers are small. In addition, the derived order-16 transform based on what is disclosed here can pack more energy into low frequency coefficients, i.e. the transformed coefficient $z_{u,v}$ with small u and v, and leave little energy to high frequency coefficients, i.e. the transformed coefficient $z_{u,v}$ with large u and v in some cases. Hence, it is an effective tool to improve the compression ability of a coder.

The details of the above and other aspects of the described apparatus, systems and techniques are set forth in the accompanying drawings, the description and claims below.

DETAILED DESCRIPTION

An exemplary a process for deriving an order-16 transform from an order-8 transform is now described.

Figure 1:
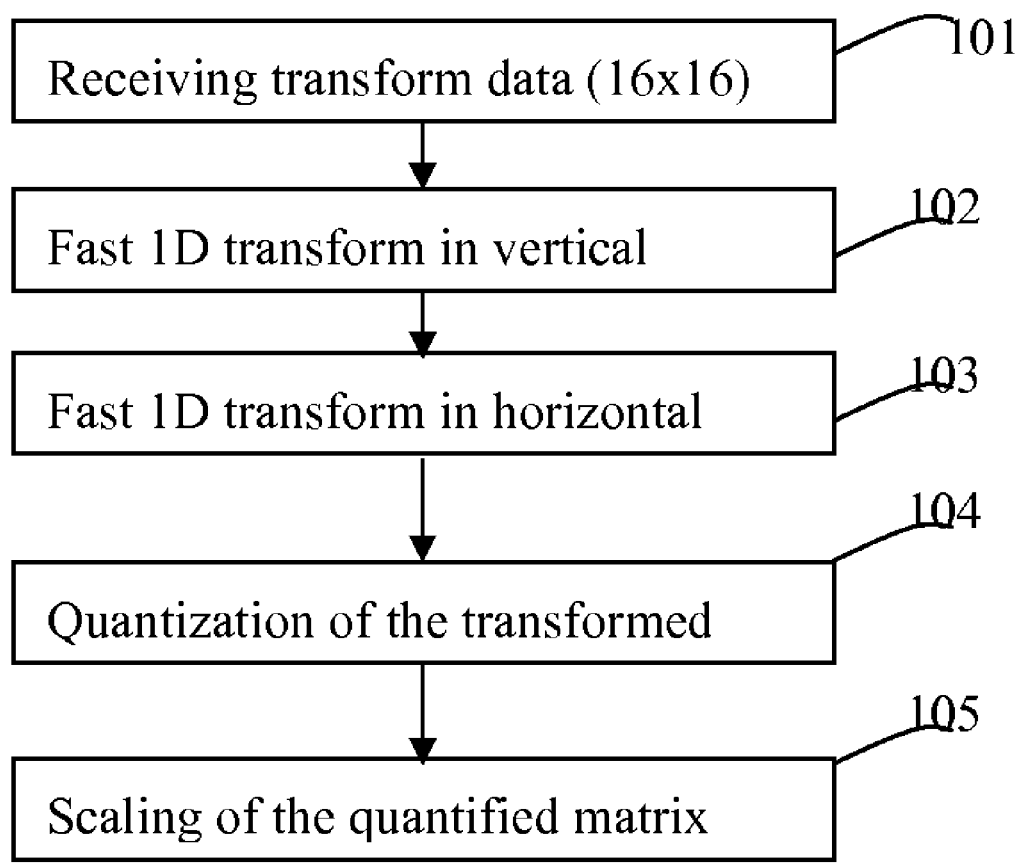
FIG. 1 illustrates an example of a flow chart of a process for deriving a forward 2D order-16 integer transform from an order-8 integer transform.

FIG. 1 illustrates a process 100 for deriving a forward 2D order-16 integer transform from an order-8 transform. The process 100 begins at step 101, where a data matrix $X_{16 \times 16}$ is retrieved from video or image signal stream. As an example, the data matrix $X_{16 \times 16}$ is given as below $$X_{16 \times 16} = \begin{bmatrix} x_{0,0} & x_{0,1} & \cdots & x_{0,15} \\ x_{1,0} & x_{1,1} & & x_{1,15} \\ \vdots & & \ddots & \vdots \\ x_{15,0} & x_{15,1} & \cdots & x_{15,15} \end{bmatrix}. \quad (1)$$

At step 102, a 1D (one dimension) integer transform is carried out for each of the 16 column vectors. For the purpose of description, let $X_m$ be one vector of the 16 column vectors of the matrix $X_{16 \times 16}$, which is denoted as $$X_m = [x_{0,m} x_{1,m} \ldots x_{15,m}]^T \quad (2).$$

Herein, the resultant of 1D integer transform is denoted as a matrix $Z_{16 \times 16}$. Let vector $Z_m$ be one vector of the matrix $Z_{16 \times 16}$, vector $Z_m = E_{16 \times 16} X_m$, i.e.

$$Z_m = \begin{bmatrix} z_{0,m} \\ z_{1,m} \\ \vdots \\ z_{15,m} \end{bmatrix} = E_{16 \times 16} X_m = E_{16 \times 16} \begin{bmatrix} x_{0,m} \\ x_{1,m} \\ \vdots \\ x_{15,m} \end{bmatrix} \quad (3)$$

wherein $E_{16 \times 16}$ is an order-16 transform, which is to be explained in detail later.

To improve the computational efficiency, a fast algorithm can be used to derive an order-16 integer transform from a conventional order-8 transform. In one implementation, the fast algorithm can include:

a) eight additions and eight subtractions; and
b) computing the order-8 transform $E_{8 \times 8}$ twice by using a known fast algorithm of the order-8 transform.

Specific examples of the fast algorithm are discussed below.

EXAMPLE 1

This Example will be discussed in referring to FIG. 2, in which an example of a fast algorithm of 1D order-16 integer transform carried out at step 102 of FIG. 1 is illustrated.

Figure 2:
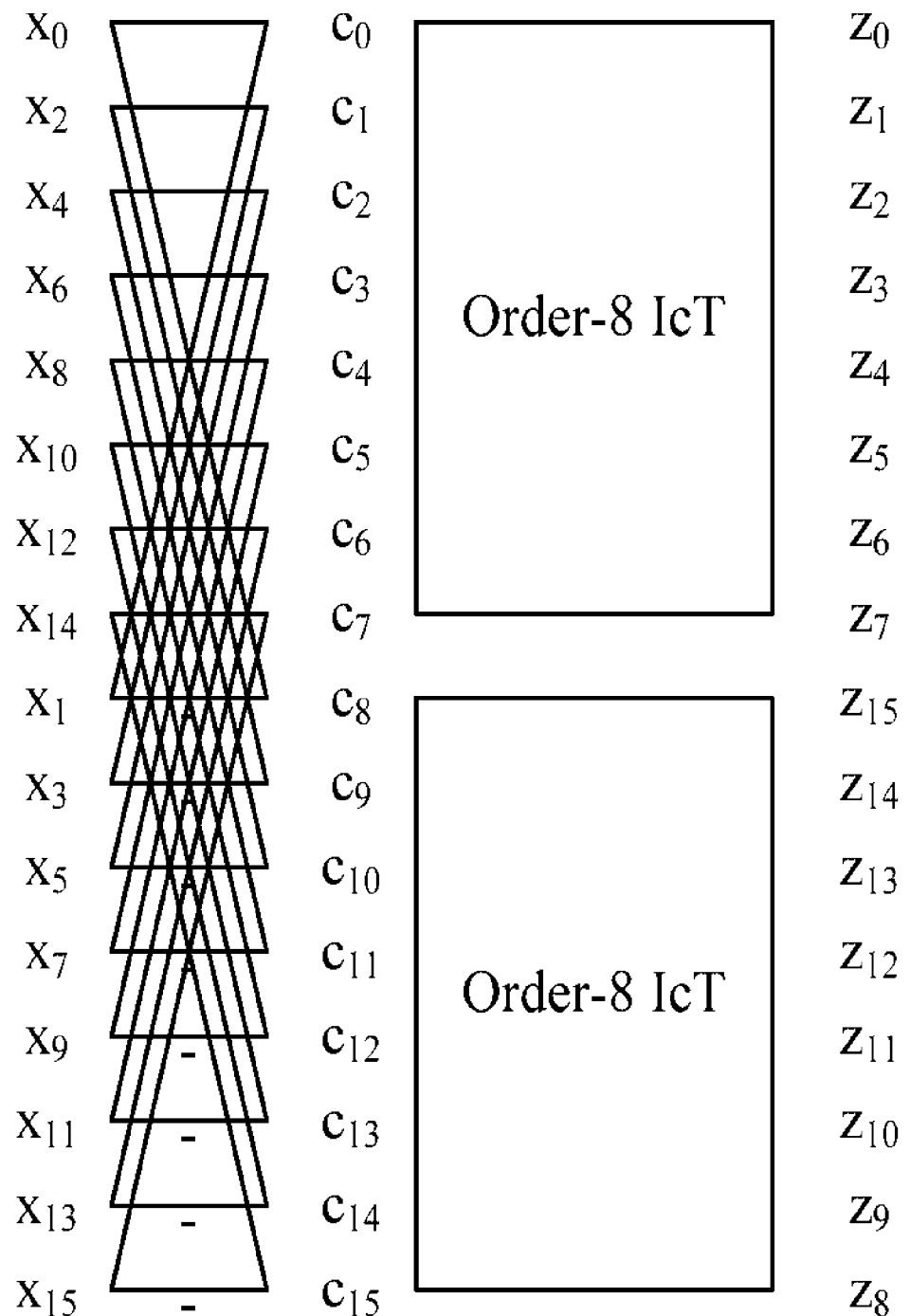
FIG. 2 illustrates an example of a fast algorithm of 1D order-16 integer transform carried out at the step 102 of FIG. 1.

Referring to FIG. 2, the vector $X_m$ is firstly transformed into an intermediate vector $C_m$ by eight additions and eight subtractions as given in equation (4), $$C_m = \begin{bmatrix} c_{0,m} \\ c_{1,m} \\ \vdots \\ c_{7,m} \\ c_{8,m} \\ c_{9,m} \\ \vdots \\ c_{15,m} \end{bmatrix} = \begin{bmatrix} x_{0,m} + x_{1,m} \\ x_{2,m} + x_{3,m} \\ \vdots \\ x_{14,m} + x_{15,m} \\ x_{0,m} - x_{1,m} \\ x_{2,m} - x_{3,m} \\ \vdots \\ x_{14,m} - x_{15,m} \end{bmatrix} \quad (4)$$

where $c_{j,m}$ is the (j)th element of the vector $C_m$, and $x_{j,m}$ is the (j)th element of the vector $X_m$, for $0 \leq j \leq 15$.

That is, $c_{i,m} = x_{2i,m} + x_{2i+1,m}$, $C_{i+8,m} = x_{2i,m} - x_{2i+1,m}$ where $0 \leq i \leq 7$.

Then, a resultant matrix $Z_{16 \times 16}$ is calculated by following two equations:

$$[z_{0,m} \, z_{1,m} \ldots z_{7,m}]^T = E_{8 \times 8} [c_{0,m} \, c_{1,m} \ldots c_{7,m}]^T \quad (5.1) \text{ and}$$

$$[z_{15,m} \, z_{14,m} \ldots z_{8,m}]^T = E_{8 \times 8} [c_{8,m} \, c_{9,m} \ldots c_{15,m}]^T \quad (5.2)$$

where $z_{j,m}$ is the (j,m)th element of the matrix $Z_{16 \times 16}$ ($0 \leq m \leq 15$), and $E_{8 \times 8}$ is a standard transform used in Windows Media Video, which is shown as $$E_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & 15 & 9 & -4 \end{bmatrix} \quad (6)$$

Since the order-8 transform is well known to those skilled in the art, the detailed discussion thereof is omitted for the sake of space.

The transformation of the data matrix $X_{16 \times 16}$ into the matrix $Z_{16 \times 16}$ using the above order-8 transform can be represented as one order-16 transform by the following equation:

$$Z_{16 \times 16} = E_{16 \times 16} X_{16 \times 16} \quad (7)$$

where, $$E_{16 \times 16} = \begin{bmatrix} 12 & 12 & 12 & 12 & 12 & 12 & 12 & 12 & 12 & 12 & 12 & 12 & 12 & 12 & 12 & 12 \\ 16 & 16 & 15 & 15 & 9 & 9 & 4 & 4 & -4 & -4 & -9 & -9 & -15 & -15 & -16 & -16 \\ 16 & 16 & 6 & 6 & -6 & -6 & -16 & -16 & -16 & -16 & -6 & -6 & 6 & 6 & 16 & 16 \\ 15 & 15 & -4 & -4 & -16 & -16 & -9 & -9 & 9 & 9 & 16 & 16 & 4 & 4 & -15 & -15 \\ 12 & 12 & -12 & -12 & -12 & -12 & 12 & 12 & 12 & 12 & -12 & -12 & -12 & -12 & 12 & 12 \\ 9 & 9 & -16 & -16 & 4 & 4 & 15 & 15 & -15 & -15 & -4 & -4 & 16 & 16 & -9 & -9 \\ 6 & 6 & -16 & -16 & 16 & 16 & -6 & -6 & -6 & -6 & 16 & 16 & -16 & -16 & 6 & 6 \\ 4 & 4 & -9 & -9 & 15 & 15 & -16 & -16 & 16 & 16 & -15 & -15 & 9 & 9 & -4 & -4 \\ 4 & -4 & -9 & 9 & 15 & -15 & -16 & 16 & 16 & -16 & -15 & 15 & 9 & -9 & -4 & 4 \\ 6 & -6 & -16 & 16 & 16 & -16 & -6 & 6 & 6 & -6 & 16 & -16 & -16 & 16 & 6 & -6 \\ 9 & -9 & -16 & 16 & 4 & -4 & 15 & -15 & -15 & 15 & -4 & 4 & 16 & -16 & -9 & 9 \\ 12 & -12 & -12 & 12 & -12 & 12 & 12 & -12 & 12 & -12 & -12 & 12 & -12 & 12 & 12 & -12 \\ 15 & -15 & -4 & 4 & -16 & 16 & -9 & 9 & 9 & -9 & 16 & -16 & 4 & -4 & -15 & 15 \\ 16 & -16 & 6 & -6 & -6 & 6 & -16 & 16 & -16 & 16 & -6 & 6 & 6 & -6 & 16 & -16 \\ 16 & -16 & 15 & -15 & 9 & -9 & 4 & -4 & -4 & 4 & -9 & 9 & -15 & 15 & -16 & 16 \\ 12 & -12 & 12 & -12 & 12 & -12 & 12 & -12 & 12 & -12 & 12 & -12 & 12 & -12 & 12 & -12 \end{bmatrix} \quad (8)$$

EXAMPLE 2

This Example will be discussed in referring to FIG. 3, which illustrates another example of a fast algorithm of 1D order-16 integer transform carried out at step 102 of FIG. 1.

Figure 3:
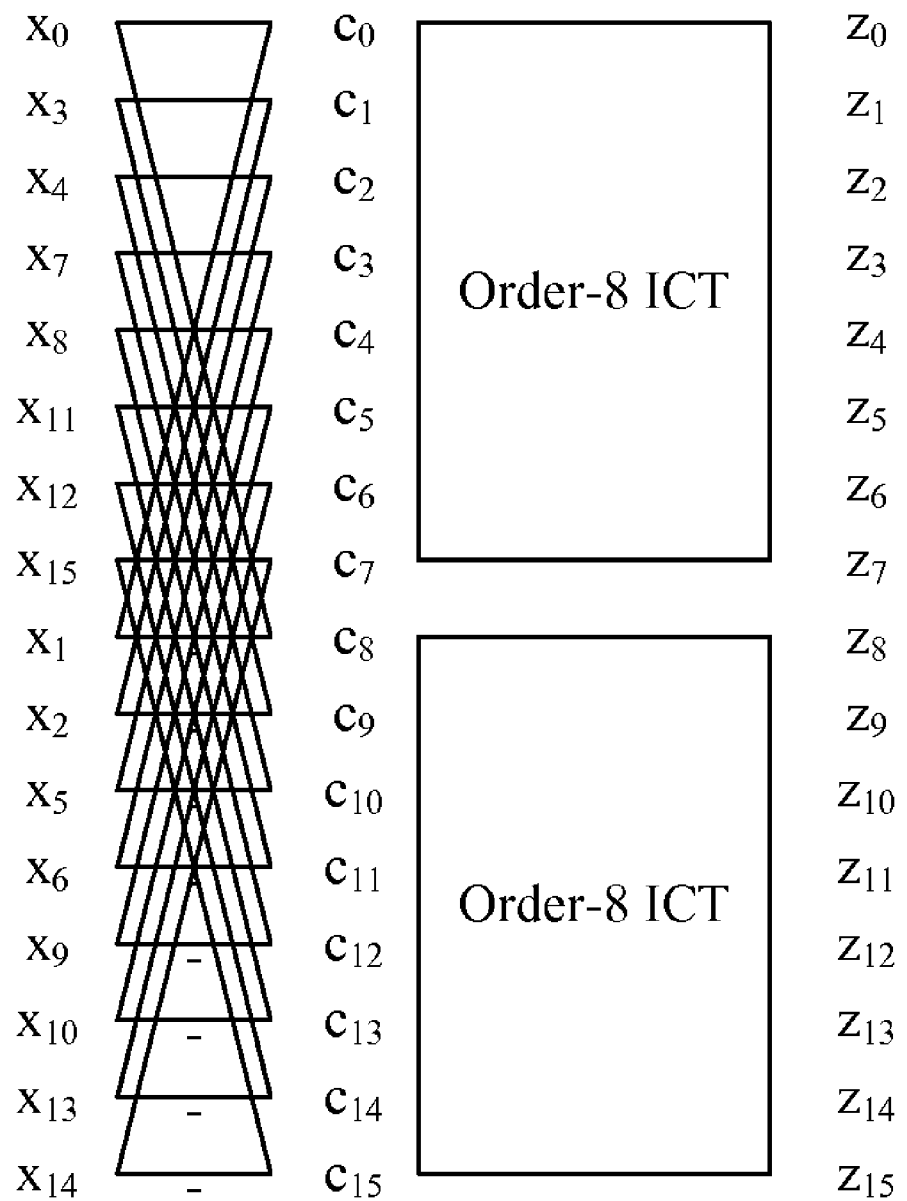
FIG. 3 illustrates an example of an alternative fast algorithm of 1D order-16 integer transform carried out in the process shown in FIG. 1.

Referring to FIG. 3, the vector $X_m$ is firstly transformed into an intermediate vector $C_m$ by eight additions and eight subtractions as given in equation (9), $$C_m = \begin{bmatrix} c_{0,m} \\ c_{1,m} \\ \vdots \\ c_{7,m} \\ c_{8,m} \\ c_{9,m} \\ c_{10,m} \\ c_{11,m} \\ c_{12,m} \\ c_{13,m} \\ c_{14,m} \\ c_{15,m} \end{bmatrix} = \begin{bmatrix} x_{0,m} + x_{1,m} \\ x_{2,m} + x_{3,m} \\ \vdots \\ x_{14,m} + x_{15,m} \\ x_{0,m} - x_{1,m} \\ x_{3,m} - x_{2,m} \\ x_{4,m} - x_{5,m} \\ x_{7,m} - x_{6,m} \\ x_{8,m} - x_{9,m} \\ x_{11,m} - x_{10,m} \\ x_{12,m} - x_{13,m} \\ x_{15,m} - x_{14,m} \end{bmatrix} \quad (9)$$

where $c_{j,m}$ is the (j)th element of the vector $C_m$, and $x_{j,m}$ is the (j)th element of the vector $X_m$, for $0 \leq j \leq 15$.

Then, a resultant matrix $Z_{16 \times 16}$ is calculated by using the standard transform $E_{8 \times 8}$ used in Windows Media Video, according to the above mentioned equations (5.1) and (5.2).

Then, the transformation of the data matrix $X_{16 \times 16}$ into the matrix $Z_{16 \times 16}$ using the above order-8 transform $E_{8 \times 8}$ can be represented as one order-16 transform by the following equation:

$$Z_{16 \times 16} = E_{16 \times 16} X_{16 \times 16} \quad (10)$$

where, $$E_{16 \times 16} = \begin{bmatrix} 12 & 12 & 12 & 12 & 12 & 12 & 12 & 12 & 12 & 12 & 12 & 12 & 12 & 12 & 12 & 12 \\ 16 & 16 & 15 & 15 & 9 & 9 & 4 & 4 & -4 & -4 & -9 & -9 & -15 & -15 & -16 & -16 \\ 16 & 16 & 6 & 6 & -6 & -6 & -16 & -16 & -16 & -16 & -6 & -6 & 6 & 6 & 16 & 16 \\ 15 & 15 & -4 & -4 & -16 & -16 & -9 & -9 & 9 & 9 & 16 & 16 & 4 & 4 & -15 & -15 \\ 12 & 12 & -12 & -12 & -12 & -12 & 12 & 12 & 12 & 12 & -12 & -12 & -12 & -12 & 12 & 12 \\ 9 & 9 & -16 & -16 & 4 & 4 & 15 & 15 & -15 & -15 & -4 & -4 & 16 & 16 & -9 & -9 \\ 6 & 6 & -16 & -16 & 16 & 16 & -6 & -6 & -6 & -6 & 16 & 16 & -16 & -16 & 6 & 6 \\ 4 & 4 & -9 & -9 & 15 & 15 & -16 & -16 & 16 & 16 & -15 & -15 & 9 & 9 & -4 & -4 \\ 12 & -12 & -12 & 12 & 12 & -12 & -12 & 12 & 12 & -12 & -12 & 12 & 12 & -12 & -12 & 12 \\ 16 & -16 & -15 & 15 & 9 & -9 & -4 & 4 & -4 & 4 & 9 & -9 & -15 & 15 & 16 & -16 \\ 16 & -16 & -6 & 6 & 6 & -6 & 16 & -16 & -16 & 16 & -6 & 6 & 6 & -6 & -16 & 16 \\ 15 & -15 & -4 & 4 & -16 & 16 & 9 & -9 & 9 & -9 & -16 & 16 & -4 & 4 & 15 & -15 \\ 12 & -12 & -12 & 12 & -12 & 12 & -12 & 12 & 12 & -12 & 12 & -12 & 12 & -12 & -12 & 12 \\ 9 & -9 & 16 & -16 & -4 & 4 & -15 & 15 & -15 & 15 & -4 & 4 & 16 & -16 & 6 & -6 \\ 6 & -6 & 16 & -16 & 16 & -16 & 6 & -6 & -6 & 6 & -16 & 16 & -16 & 16 & -6 & 6 \\ 4 & -4 & 9 & -9 & 15 & -15 & 16 & -16 & 16 & -16 & 15 & -15 & 9 & -9 & 4 & -4 \end{bmatrix} \quad (11)$$

A 2D fast algorithm for the order-16 integer transform can be achieved by performing the 1D integer transform in vertical for each column in $X_{16 \times 16}$ to form matrix $Z_{16 \times 16}$ of elements $z_{i,j}$ and then in horizontal for each row in $Z_{16 \times 16}$ to form matrix $Z'_{16 \times 16}$ of elements $Z_{i,j}'$ as given in equation (12)

$$Z'_{16 \times 16} = E_{16 \times 16} X_{16 \times 16} E_{16 \times 16}^T. \quad (12)$$

Specifically, referring to FIG. 1 again, at step 102, for each of 16 column vectors of the matrix $X_{16 \times 16}$, the above mentioned 1D integer transform is carried out to achieve an intermediate matrix $Z_{16 \times 16}$, and then at step 103, the above mentioned 1D integer transform is carried out again for each of the 16 row vectors of the intermediate matrix $Z_{16 \times 16}$ so as to achieve the resultant matrix $Z_{16 \times 16}'$.

In FIG. 1, step 102 is performed before step 103. Alternatively, one may choose to perform step 103 before step 102. In other words, one may perform the 1D transform in horizontal for each row in $X_{16 \times 16}$ first. Such step is represented by the operation $X_{16 \times 16} E^T_{16 \times 16}$ in (12). It is then followed by the 1D transform in vertical, which is represented by the multiplication of $E_{16 \times 16}$ in (12). The same $Z_{16 \times 16}'$ can be obtained in either way.

As is well known in the art, a transform is good if it can pack more energy into low frequency coefficients (i.e. $z'_{u,v}$ with small u, v) and leave little energy to high frequency coefficients (i.e. $z'_{u,v}$ with large u, v). In general, a transform with its low frequency basis vectors (i.e. the first few row of $E_{16 \times 16}$) resembling a slowly changing vector $x_i$ of the matrix $X_{16 \times 16}$ is good. As is shown in equation (8), the first three basis vectors of transform $E_{16 \times 16}$ are as follows $E_1$=[16 16 15 15 9 9 4 4 −4 −4 −9 −9 −15 −15 −16 −16]

$E_2$=[16 16 6 6 −6 −6 −16 −16 −16 −16 −6 −6 6 6 16 16]

$E_3$=[15 15 −4 −4 −16 −16 −9 −9 9 9 16 16 4 4 −15 −15].

In most cases, most of the energy of $X_{16 \times 16}$ is packed into low frequency coefficients related to the first several basis vectors of transform $E_{16 \times 16}$ like $E_1$, $E_2$, and $E_3$ etc. The remaining small amount of energy of $X_{16 \times 16}$ is represented by other coefficients which become zero after quantization. As a result, higher compression rates can be achieved.

Then, the process 100 goes to step 104, where a quantization is carried out to convert the transformed matrix $Z'_{16 \times 16}$ into a matrix of quantized transform $Y_Q(i,j)$, which requires less bits for representation. The amount of the bit reduction is controlled by a quantization parameter denoted as QP, which is shown as follows:

$$Z'_{16 \times 16} \xrightarrow{QP} Y_Q(i,j).$$

Then, at step 105, the quantized matrix $Y_Q(i,j)$ is scaled by a scaling matrix $K_{16 \times 16}$ to form a matrix $Y_{16 \times 16}$, as given in equation (13)

$$y_{i,j} = Y_Q(i,j) \cdot K_{16 \times 16}^2(i,j) \qquad (13)$$

where $y_{i,j}$ is the (i,j)th element of matrix $Y_{16 \times 16}$, and $K_{16 \times 16}(i,j)$ is the (i,j)th element of $K_{16 \times 16}$. $K_{16 \times 16}$ is derived from a scaling matrix $K_{8 \times 8}$, which is listed as follows:

$$K_{8 \times 8} = \begin{bmatrix} a^2 & ab & ac & ab & a^2 & ab & ac & ab \\ ab & b^2 & bc & b^2 & ab & b^2 & bc & b^2 \\ ac & bc & c^2 & bc & ac & bc & c^2 & bc \\ ab & b^2 & bc & b^2 & ab & b^2 & bc & b^2 \\ a^2 & ab & ac & ab & a^2 & ab & ac & ab \\ ab & b^2 & bc & b^2 & ab & b^2 & bc & b^2 \\ ac & bc & c^2 & bc & ac & bc & c^2 & bc \\ ab & b^2 & bc & b^2 & ab & b^2 & bc & b^2 \end{bmatrix} \text{ where } \begin{cases} a = \dfrac{1}{\sqrt{1152}} \\ b = \dfrac{1}{\sqrt{1156}} \\ c = \dfrac{1}{\sqrt{1168}} \end{cases}. \qquad (14)$$

And then, where the transform $E_{16 \times 16}$ is given as equation (8), the scaling matrix $K_{16 \times 16}$ is represented as $$K_{16 \times 16} = \frac{1}{2} \begin{bmatrix} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ \hline ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{bmatrix} \qquad (15)$$

Where the transform $E_{16 \times 16}$ is given as equation (11), and the scaling matrix $K_{16 \times 16}$ is represented as $$K_{16 \times 16} = \frac{1}{2} \begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ \hline a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}. \qquad (16)$$

From the above, the 2D integer transform of X into Y is discussed. It should be appreciated that an inverse 2D integer transform of Y into X may be easily implemented based on the above mentioned 2D transform of X into Y, and be represented as $$X = E_{16 \times 16}^T \cdot Y \cdot E_{16 \times 16} = E_{16 \times 16}^T \cdot \begin{bmatrix} y_{0,0} & y_{0,1} & \cdots & y_{0,15} \\ y_{1,0} & y_{1,1} & & y_{1,15} \\ \vdots & & \ddots & \vdots \\ y_{15,0} & y_{15,1} & \cdots & y_{15,15} \end{bmatrix} \cdot E_{16 \times 16}. \quad (17)$$

Since the inverse 2D integer transform of Y into X can be computed by a similar way as stated above, the detailed description thereof is then omitted.

Figure 4:
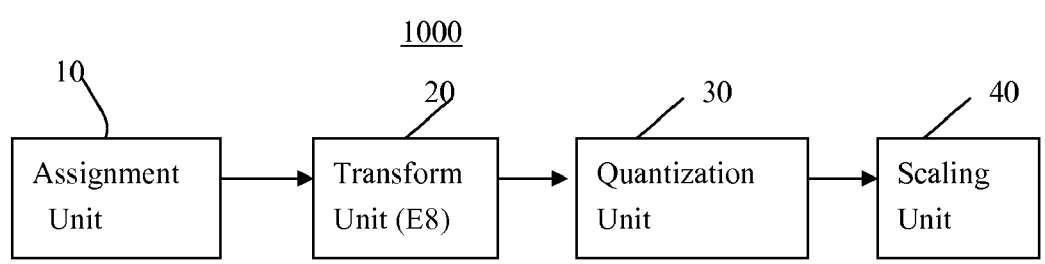
FIG. 4 illustrates an example of an apparatus for deriving a forward 2D order-16 integer transform from an order-8 integer transform.

FIG. 4 illustrates exemplarily an embodiment of an apparatus 1000 for the implementation of the process as shown in FIG. 1. As is showed therein, the apparatus 1000 comprises an assignment unit 10, a transforming unit 20, a quantization unit 30 and a scaling unit 40.

The assignment unit 10 is configured to retrieve a data matrix $X_{16 \times 16}$ to be transformed, and then to assign of the retrieved data to an intermediate matrix $C_{16 \times 16}$ under the rule set forth in equation (4) or equation (9).

The transform unit 20 carries out two order-8 transforms for the matrix $C_{16 \times 16}$ by using the conventional $E_{8 \times 8}$, which is showed in equation (6), so as to output the matrix $Z_{16 \times 16}$. $E_{8 \times 8}$ may be embedded in the transform unit 20. Alternatively, $E_{8 \times 8}$ may be stored in any other separately memory (not shown). In this case, the transform unit 20 may be capable of retrieving $E_{8 \times 8}$ from the memory.

The quantization unit 30 receives the output matrix $Z_{16 \times 16}$, and then converts the matrix $Z_{16 \times 16}$ into a quantized transform coefficient $Y_Q(i,j)$, which requires less bits for representation.

The scaling unit 40 receives the quantized coefficient $Y_Q(ij)$, and then uses a scaling matrix $K_{16 \times 16}$ to make $Y_Q(i,j)$ into a matrix $Y_{16 \times 16}$, as is shown in equation (13), wherein matrix $K_{16 \times 16}$ is shown in equation (15) or equation (16). Herein, $K_{16 \times 16}$ may be embedded in the quantization unit 30. Alternatively, $K_{16 \times 16}$ may be stored in any other separately memory (not shown). In this case, the quantization unit 30 may be capable of retrieving $K_{16 \times 16}$ from the memory.

While the assignment unit 10, the transforming unit 20, the quantization unit 30 and the scaling unit 40 are shown in FIG. 4 and described herein as four separate units, other implementations are possible. For example, the units 10, 20, 30 and 40 may be implemented as lesser or more units as required, and may be implemented either by software or hardware, or the combination of software and hardware.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

A computer system for implementing the disclosed embodiments can include client computers (clients) and server computers (servers). A client and a server are generally remote from each other and typically interact through a communication network. The relationship of client and server can arise by virtue of computer programs running on the respective computers and having a client-server relationship to each other.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, operations are depicted in the drawings in a particular order, and such operations should be performed in the particular order shown or in sequential order, and that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

The invention claimed is:

1. A process for deriving an order-16 integer transform from an order-8 integer transform in image and video coding, comprising:
   retrieving a data matrix $X_{16 \times 16}$ to be transformed;
   assigning the retrieved matrix $X_{16 \times 16}$ to an intermediate matrix $C_{16 \times 16}$ by eight additions and eight subtractions; and
   deriving a resultant matrix $Z_{16 \times 16}$ by carrying out the order-8 integer transform twice by a rule of $$[z_{0,m} z_{1,m} \ldots z_{7,m}]^T = E_{8 \times 8} [c_{0,m} c_{1,m} \ldots c_{7,m}]^T$$

$$[z_{8,m} z_{9,m} \ldots z_{15,m}]^T = E_{8 \times 8} [c_{8,m} c_{9,m} \ldots c_{15,m}]^T$$

wherein $z_{n,m}$ is of the (n,m)th element of the matrix $Z_{16 \times 16}$, and $E_{8 \times 8}$ is a standard order-8 transform used in the standard of Microsoft Media Video.

2. The process according to claim 1, wherein the assigning is carried out according to a rule of $$C_m = \begin{bmatrix} c_{0,m} \\ c_{1,m} \\ \ldots \\ c_{7,m} \\ c_{8,m} \\ c_{9,m} \\ \ldots \\ c_{15,m} \end{bmatrix} = \begin{bmatrix} x_{0,m} + x_{1,m} \\ x_{2,m} + x_{3,m} \\ \ldots \\ x_{14,m} + x_{15,m} \\ x_{0,m} - x_{1,m} \\ x_{2,m} - x_{3,m} \\ \ldots \\ x_{14,m} - x_{15,m} \end{bmatrix}$$

wherein $C_m$ is the mth vector of the matrix $C_{16 \times 16}$, $c_{i,m}$ is the (i, m)th element of $C_{16 \times 16}$, and $x_{i,m}$ is the (i, m)th element of $X_{16 \times 16}$, $0 \leq m \leq 15$ and $0 \leq i \leq 15$.

3. The process according to claim 1, wherein the assigning is carried out according to a rule of $$C_m = \begin{bmatrix} c_{0,m} \\ c_{1,m} \\ \vdots \\ c_{7,m} \\ c_{8,m} \\ c_{9,m} \\ c_{10,m} \\ c_{11,m} \\ c_{12,m} \\ c_{13,m} \\ c_{14,m} \\ c_{15,m} \end{bmatrix} = \begin{bmatrix} x_{0,m} + x_{1,m} \\ x_{2,m} + x_{3,m} \\ \vdots \\ x_{14,m} + x_{15,m} \\ x_{0,m} + x_{1,m} \\ x_{3,m} + x_{2,m} \\ x_{4,m} + x_{5,m} \\ x_{7,m} + x_{6,m} \\ x_{8,m} + x_{9,m} \\ x_{11,m} + x_{10,m} \\ x_{12,m} + x_{13,m} \\ x_{15,m} + x_{14,m} \end{bmatrix}$$

wherein $C_m$ is the mth vector of the matrix $C_{16 \times 16}$, $c_{i,m}$ is the (i, m)th element of $C_{16 \times 16}$, and $x_{i,m}$ is the (i, m)th element of $X_{16 \times 16}$, $0 \leq m \leq 15$ and $0 \leq i \leq 15$.

4. The process according to claim 2, further comprising:
quantizing the resultant matrix $Z_{16 \times 16}$ by using a quantization parameter used in the Microsoft Media Video.

5. The process according to claim 3, further comprising:
quantizing the resultant matrix $Z_{16 \times 16}$ by using a quantization parameter used in the Microsoft Media Video.

6. The process according to claim 4, further comprising:
normalizing the quantized matrix by using a scaling matrix $K_{16 \times 16}$, where, $$K_{16 \times 16} = \frac{1}{2} \begin{bmatrix} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{bmatrix}$$

and where $a = \dfrac{1}{\sqrt{1512}}$, $b = \dfrac{1}{\sqrt{1156}}$ and $c = \dfrac{1}{\sqrt{1168}}$.

7. The process according to claim 5, further comprising:
normalizing the quantized matrix by using a scaling matrix $K_{16\times16}$, where, $$K_{16\times16} = \frac{1}{2}\begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}$$

and where $a = \dfrac{1}{\sqrt{1512}}$, $b = \dfrac{1}{\sqrt{1156}}$ and $c = \dfrac{1}{\sqrt{1168}}$.

8. A method for processing an order-16 transform in image and video coding, comprising:
receiving a data matrix $X_{16\times16}$ to be transformed; and
transforming the received data matrix $X_{16\times16}$ with an order-16 transform matrix $E_{16\times16}$ to generate an output matrix $Z_{16\times16}$ by a rule of $Z_{16\times16}=E_{16\times16}X_{16\times16}$, wherein the transform matrix $E_{16\times16}$ is represented as $$E_{16\times16} = \begin{bmatrix} 12 & 12 & 12 & 12 & 12 & 12 & 12 & 12 & 12 & 12 & 12 & 12 & 12 & 12 & 12 & 12 \\ 16 & 16 & 15 & 15 & 9 & 9 & 4 & 4 & -4 & -4 & -9 & -9 & -15 & -15 & -16 & -16 \\ 16 & 16 & 6 & 6 & -6 & -6 & -16 & -16 & -16 & -16 & -6 & -6 & 6 & 6 & 16 & 16 \\ 15 & 15 & -4 & -4 & -16 & -16 & -9 & -9 & 9 & 9 & 16 & 16 & 4 & 4 & -15 & -15 \\ 12 & 12 & -12 & -12 & -12 & -12 & 12 & 12 & 12 & 12 & -12 & -12 & -12 & -12 & 12 & 12 \\ 9 & 9 & -16 & -16 & 4 & 4 & 15 & 15 & -15 & -15 & -4 & -4 & 16 & 16 & -9 & -9 \\ 6 & 6 & -16 & -16 & 16 & 16 & -6 & -6 & -6 & -6 & 16 & 16 & -16 & -16 & 6 & 6 \\ 4 & 4 & -9 & -9 & 15 & 15 & -16 & -16 & 16 & 16 & -15 & -15 & 9 & 9 & -4 & -4 \\ 4 & -4 & -9 & 9 & 15 & -15 & -16 & 16 & 16 & -16 & -15 & 15 & 9 & -9 & -4 & 4 \\ 6 & -6 & -16 & 16 & 16 & -16 & -6 & 6 & -6 & 6 & 16 & -16 & -16 & 16 & 6 & -6 \\ 9 & -9 & -16 & 16 & 4 & -4 & 15 & -15 & -15 & 15 & -4 & 4 & 16 & -16 & -9 & 9 \\ 12 & -12 & -12 & 12 & -12 & 12 & 12 & -12 & 12 & -12 & -12 & 12 & -12 & 12 & 12 & -12 \\ 15 & -15 & -4 & 4 & -16 & 16 & -9 & 9 & 9 & -9 & 16 & -16 & 4 & -4 & -15 & 15 \\ 16 & -16 & 6 & -6 & -6 & 6 & -16 & 16 & -16 & 16 & -6 & 6 & 6 & -6 & 16 & -16 \\ 16 & -16 & 15 & -15 & 9 & -9 & 4 & -4 & -4 & 4 & -9 & 9 & -15 & 15 & -16 & 16 \\ 12 & -12 & 12 & -12 & 12 & -12 & 12 & -12 & 12 & -12 & 12 & -12 & 12 & -12 & 12 & -12 \end{bmatrix}.$$

9. The method according to claim 8, further comprising:
quantizing the output matrix $Z_{16\times16}$ by using a quantization parameter used in the Microsoft Media Video.

10. The process according to claim 9, further comprising:
normalizing the quantized matrix by using a scaling matrix $K_{16\times16}$, where, $$K_{16\times16} = \frac{1}{2}\left[\begin{array}{cccccccc|cccccccc} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ \hline ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{array}\right]$$

and where $a = \frac{1}{\sqrt{1512}}$, $b = \frac{1}{\sqrt{1156}}$ and $c = \frac{1}{\sqrt{1168}}$.

11. A method for processing an order-16 transform in image and video coding, comprising:
receiving a data matrix $X_{16\times16}$ to be transformed; and
transforming the received data matrix $X_{16\times16}$ with an order-16 transform matrix $E_{16\times16}$ to generate an output matrix $Z_{16\times16}$ by a rule of $Z_{16\times16}=E_{16\times16}X_{16\times16}$,
wherein the transform matrix $E_{16\times16}$ is represented as $$E_{16\times16} = \frac{1}{2}\left[\begin{array}{cccccccccccccccc} 12 & 12 & 12 & 12 & 12 & 12 & 12 & 12 & 12 & 12 & 12 & 12 & 12 & 12 & 12 & 12 \\ 16 & 16 & 15 & 15 & 9 & 9 & 4 & 4 & -4 & -4 & -9 & -9 & -15 & -15 & -16 & -16 \\ 16 & 16 & 6 & 6 & -6 & -6 & -16 & -16 & -16 & -16 & -6 & -6 & 6 & 6 & 16 & 16 \\ 15 & 15 & -4 & -4 & -16 & -16 & -9 & -9 & 9 & 9 & 16 & 16 & 4 & 4 & -15 & -15 \\ 12 & 12 & -12 & -12 & -12 & -12 & 12 & 12 & 12 & 12 & -12 & -12 & -12 & -12 & 12 & 12 \\ 9 & 9 & -16 & -16 & 4 & 4 & 15 & 15 & -15 & -15 & -4 & -4 & 16 & 16 & -9 & -9 \\ 6 & 6 & -16 & -16 & 16 & 16 & -6 & -6 & -6 & -6 & 16 & 16 & -16 & -16 & 6 & 6 \\ 4 & 4 & -9 & -9 & 15 & 15 & -16 & -16 & 16 & 16 & -15 & -15 & 9 & 9 & -4 & -4 \\ 12 & -12 & -12 & 12 & 12 & -12 & -12 & 12 & 12 & -12 & -12 & 12 & 12 & -12 & -12 & 12 \\ 16 & -16 & -15 & 15 & 9 & -9 & -4 & 4 & -4 & 4 & 9 & -9 & -15 & 15 & 16 & -16 \\ 16 & -16 & -6 & 6 & 6 & -6 & 16 & -16 & -16 & 16 & -6 & 6 & 6 & -6 & -16 & 16 \\ 15 & -15 & -4 & 4 & -16 & 16 & 9 & -9 & 9 & -9 & -16 & 16 & -4 & 4 & 15 & -15 \\ 12 & -12 & -12 & 12 & -12 & 12 & -12 & 12 & 12 & -12 & 12 & -12 & 12 & -12 & -12 & 12 \\ 9 & -9 & 16 & -16 & -4 & 4 & -15 & 15 & -15 & 15 & -4 & 4 & 16 & -16 & 6 & -6 \\ 6 & -6 & 16 & -16 & 16 & -16 & 6 & -6 & -6 & 6 & -16 & 16 & -16 & 16 & -6 & 6 \\ 4 & -4 & 9 & -9 & 15 & -15 & 16 & -16 & 16 & -16 & 15 & -15 & 9 & -9 & 4 & -4 \end{array}\right].$$

12. The method according to claim 11, further comprising: quantizing the output matrix by using a quantization parameter used in the Microsoft Media Video.

13. The process according to claim 12, further comprising: normalizing the quantized matrix by using a scaling matrix $K_{16 \times 16}$, where, $$K_{16 \times 16} = \frac{1}{2} \begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}$$

and where $a = \frac{1}{\sqrt{1512}}$, $b = \frac{1}{\sqrt{1156}}$ and $c = \frac{1}{\sqrt{1168}}$.

14. An apparatus for deriving an order-16 integer transform from an order-8 integer transform in image and video coding, comprising:
  an assignment unit configured to retrieve a data matrix $X_{16 \times 16}$ to be transformed, and then to assign the retrieved matrix $X_{16 \times 16}$ to an intermediate matrix $C_{16 \times 16}$ by eight additions and eight subtractions; and
  a transform unit configured to derive a resultant matrix $Z_{16 \times 16}$ by carrying out the order-8 integer transform twice by a rule of $$[z_{0,m} z_{1,m} \ldots z_{7,m}]^T = E_{8 \times 8} [c_{0,m} c_{1,m} \ldots c_{7,m}]^T$$

$$[z_{8,m} z_{9,m} \ldots z_{15,m}]^T = E_{8 \times 8} [c_{8,m} c_{9,m} \ldots c_{15,m}]^T$$

wherein $z_{n,m}$ is of the (n,m)th element of the matrix $Z_{16 \times 16}$, and $E_{8 \times 8}$ is a standard order-8 transform used in the standard of Microsoft Media Video.

15. The apparatus according to claim 14, wherein the assignment unit is configured to assign the retrieved matrix $X_{16 \times 16}$ to an intermediate matrix $C_{16 \times 16}$ according to a rule of $$C_m = \begin{bmatrix} c_{0,m} \\ c_{1,m} \\ \vdots \\ c_{7,m} \\ c_{8,m} \\ c_{9,m} \\ \vdots \\ c_{15,m} \end{bmatrix} = \begin{bmatrix} x_{0,m} + x_{1,m} \\ x_{2,m} + x_{3,m} \\ \vdots \\ x_{14,m} + x_{15,m} \\ x_{0,m} - x_{1,m} \\ x_{2,m} - x_{3,m} \\ \vdots \\ x_{14,m} - x_{15,m} \end{bmatrix}$$

wherein $C_m$ is the mth vector of the matrix $C_{16 \times 16}$, $c_{i,m}$ is the (i, m)th element of $C_{16 \times 16}$, and $x_{i,m}$ is the (i, m)th element of $X_{16 \times 16}$, $0 \leq m \leq 15$ and $0 \leq i \leq 15$.

16. The apparatus according to claim 14, wherein the assignment unit is configured to assign the retrieved matrix $X_{16 \times 16}$ to an intermediate matrix $C_{16 \times 16}$ according to a rule of $$C_m = \begin{bmatrix} c_{0,m} \\ c_{1,m} \\ \vdots \\ c_{7,m} \\ c_{8,m} \\ c_{9,m} \\ c_{10,m} \\ c_{11,m} \\ c_{12,m} \\ c_{13,m} \\ c_{14,m} \\ c_{15,m} \end{bmatrix} = \begin{bmatrix} x_{0,m} + x_{1,m} \\ x_{2,m} + x_{3,m} \\ \vdots \\ x_{14,m} - x_{15,m} \\ x_{0,m} - x_{1,m} \\ x_{3,m} - x_{2,m} \\ x_{4,m} - x_{5,m} \\ x_{7,m} - x_{6,m} \\ x_{8,m} - x_{9,m} \\ x_{11,m} - x_{10,m} \\ x_{12,m} - x_{13,m} \\ x_{15,m} - x_{14,m} \end{bmatrix}$$

wherein $C_m$ is the mth vector of the matrix $C_{16 \times 16}$, $c_{i,m}$ is the (i, m)th element of $C_{16 \times 16}$, and $c_{i,m}$ is the (i, m)th element of $X_{16 \times 16}$, $0 \leq m \leq 15$ and $0 \leq i \leq 15$.

17. The apparatus according to claim 15, further comprising:
  a quantization unit configured to quantize the resultant matrix $Z_{16 \times 16}$ by using a quantization parameter used in the Microsoft Media Video.

18. The apparatus according to claim 16, further comprising:
  a quantization unit configured to quantize the resultant matrix $Z_{16 \times 16}$ by using a quantization parameter used in the Microsoft Media Video.

19. The apparatus according to claim 17, further comprising:
  a scaling unit configured to normalize the quantized matrix by using a scaling matrix $K_{16 \times 16}$, where, $$K_{16\times16} = \frac{1}{2}\left[\begin{array}{cccccccc|cccccccc}
a^2 & ab & ac & ab & a^2 & ab & ac & ab & ab & ac & ab & a^2 & ab & ac & ab & a^2 \\
ab & b^2 & bc & b^2 & ab & b^2 & bc & b^2 & b^2 & bc & b^2 & ab & b^2 & bc & b^2 & ab \\
ac & bc & c^2 & bc & ac & bc & c^2 & bc & bc & c^2 & bc & ac & bc & c^2 & bc & ac \\
ab & b^2 & bc & b^2 & ab & b^2 & bc & b^2 & b^2 & bc & b^2 & ab & b^2 & bc & b^2 & ab \\
a^2 & ab & ac & ab & a^2 & ab & ac & ab & ab & ac & ab & a^2 & ab & ac & ab & a^2 \\
ab & b^2 & bc & b^2 & ab & b^2 & bc & b^2 & b^2 & bc & b^2 & ab & b^2 & bc & b^2 & ab \\
ac & bc & c^2 & bc & ac & bc & c^2 & bc & bc & c^2 & bc & ac & bc & c^2 & bc & ac \\
ab & b^2 & bc & b^2 & ab & b^2 & bc & b^2 & b^2 & bc & b^2 & ab & b^2 & bc & b^2 & ab \\
\hline
ab & b^2 & bc & b^2 & ab & b^2 & bc & b^2 & b^2 & bc & b^2 & ab & b^2 & bc & b^2 & ab \\
ac & bc & c^2 & bc & ac & bc & c^2 & bc & bc & c^2 & bc & ac & bc & c^2 & bc & ac \\
ab & b^2 & bc & b^2 & ab & b^2 & bc & b^2 & b^2 & bc & b^2 & ab & b^2 & bc & b^2 & ab \\
a^2 & ab & ac & ab & a^2 & ab & ac & ab & ab & ac & ab & a^2 & ab & ac & ab & a^2 \\
ab & b^2 & bc & b^2 & ab & b^2 & bc & b^2 & b^2 & bc & b^2 & ab & b^2 & bc & b^2 & ab \\
ac & bc & c^2 & bc & ac & bc & c^2 & bc & bc & c^2 & bc & ac & bc & c^2 & bc & ac \\
ab & b^2 & bc & b^2 & ab & b^2 & bc & b^2 & b^2 & bc & b^2 & ab & b^2 & bc & b^2 & ab \\
a^2 & ab & ac & ab & a^2 & ab & ac & ab & ab & ac & ab & a^2 & ab & ac & ab & a^2
\end{array}\right]$$

and where $a = \dfrac{1}{\sqrt{1512}}$, $b = \dfrac{1}{\sqrt{1156}}$ and $c = \dfrac{1}{\sqrt{1168}}$.

20. The apparatus according to claim 18, further comprising:
  a scaling unit configured to normalize the quantized matrix by using a scaling matrix $K_{16\times16}$, where, $$K_{16\times16} = \frac{1}{2}\left[\begin{array}{cccccccc|cccccccc}
a^2 & ab & ac & ab & a^2 & ab & ac & ab & a^2 & ab & ac & ab & a^2 & ab & ac & ab \\
ab & b^2 & bc & b^2 & ab & b^2 & bc & b^2 & ab & b^2 & bc & b^2 & ab & b^2 & bc & b^2 \\
ac & bc & c^2 & bc & ac & bc & c^2 & bc & ac & bc & c^2 & bc & ac & bc & c^2 & bc \\
ab & b^2 & bc & b^2 & ab & b^2 & bc & b^2 & ab & b^2 & bc & b^2 & ab & b^2 & bc & b^2 \\
a^2 & ab & ac & ab & a^2 & ab & ac & ab & a^2 & ab & ac & ab & a^2 & ab & ac & ab \\
ab & b^2 & bc & b^2 & ab & b^2 & bc & b^2 & ab & b^2 & bc & b^2 & ab & b^2 & bc & b^2 \\
ac & bc & c^2 & bc & ac & bc & c^2 & bc & ac & bc & c^2 & bc & ac & bc & c^2 & bc \\
ab & b^2 & bc & b^2 & ab & b^2 & bc & b^2 & ab & b^2 & bc & b^2 & ab & b^2 & bc & b^2 \\
\hline
a^2 & ab & ac & ab & a^2 & ab & ac & ab & a^2 & ab & ac & ab & a^2 & ab & ac & ab \\
ab & b^2 & bc & b^2 & ab & b^2 & bc & b^2 & ab & b^2 & bc & b^2 & ab & b^2 & bc & b^2 \\
ac & bc & c^2 & bc & ac & bc & c^2 & bc & ac & bc & c^2 & bc & ac & bc & c^2 & bc \\
ab & b^2 & bc & b^2 & ab & b^2 & bc & b^2 & ab & b^2 & bc & b^2 & ab & b^2 & bc & b^2 \\
a^2 & ab & ac & ab & a^2 & ab & ac & ab & a^2 & ab & ac & ab & a^2 & ab & ac & ab \\
ab & b^2 & bc & b^2 & ab & b^2 & bc & b^2 & ab & b^2 & bc & b^2 & ab & b^2 & bc & b^2 \\
ac & bc & c^2 & bc & ac & bc & c^2 & bc & ac & bc & c^2 & bc & ac & bc & c^2 & bc \\
ab & b^2 & bc & b^2 & ab & b^2 & bc & b^2 & ab & b^2 & bc & b^2 & ab & b^2 & bc & b^2
\end{array}\right]$$

and where $a = \dfrac{1}{\sqrt{1512}}$, $b = \dfrac{1}{\sqrt{1156}}$ and $c = \dfrac{1}{\sqrt{1168}}$.

21. An apparatus for processing an order-16 transform in image and video coding, comprising:
  a receiving unit configured to receive a data matrix $X_{16\times16}$ to be transformed; and
  a transform unit configured to transform the received data matrix $X_{16\times16}$ with an order-16 transform matrix $E_{16\times16}$ to generate an output matrix $Z_{16\times16}$ by a rule of $Z_{16\times16}=E_{16\times16}X_{16\times16}$,
wherein the transform matrix $E_{16\times16}$ is represented as $$E_{16\times16} = \begin{bmatrix} 12 & 12 & 12 & 12 & 12 & 12 & 12 & 12 & 12 & 12 & 12 & 12 & 12 & 12 & 12 & 12 \\ 16 & 16 & 15 & 15 & 9 & 9 & 4 & 4 & -4 & -4 & -9 & -9 & -15 & -15 & -16 & -16 \\ 16 & 16 & 6 & 6 & -6 & -6 & -16 & -16 & -16 & -16 & -6 & -6 & 6 & 6 & 16 & 16 \\ 15 & 15 & -4 & -4 & -16 & -16 & -9 & -9 & 9 & 9 & 16 & 16 & 4 & 4 & -15 & -15 \\ 12 & 12 & -12 & -12 & -12 & -12 & 12 & 12 & 12 & 12 & -12 & -12 & -12 & -12 & 12 & 12 \\ 9 & 9 & -16 & -16 & 4 & 4 & 15 & 15 & -15 & -15 & -4 & -4 & 16 & 16 & -9 & -9 \\ 6 & 6 & -16 & -16 & 16 & 16 & -6 & -6 & -6 & -6 & 16 & 16 & -16 & -16 & 6 & 6 \\ 4 & 4 & -9 & -9 & 15 & 15 & -16 & -16 & 16 & 16 & -15 & -15 & 9 & 9 & -4 & -4 \\ 4 & -4 & -9 & 9 & 15 & -15 & -16 & 16 & 16 & -16 & -15 & 15 & 9 & -9 & -4 & 4 \\ 6 & -6 & -16 & 16 & 16 & -16 & -6 & 6 & -6 & 6 & 16 & -16 & -16 & 16 & 6 & -6 \\ 9 & -9 & -16 & 16 & 4 & -4 & 15 & -15 & 15 & -15 & -4 & 4 & 16 & -16 & -9 & 9 \\ 12 & -12 & -12 & 12 & -12 & 12 & 12 & -12 & 12 & -12 & -12 & 12 & -12 & 12 & 12 & -12 \\ 15 & -15 & -4 & 4 & -16 & 16 & -9 & 9 & 9 & -9 & 16 & -16 & 4 & -4 & -15 & 15 \\ 16 & -16 & 6 & -6 & -6 & 6 & -16 & 16 & -16 & 16 & -6 & 6 & 6 & -6 & 16 & -16 \\ 16 & -16 & 15 & -15 & 9 & -9 & 4 & -4 & -4 & 4 & -9 & 9 & -15 & 15 & -16 & 16 \\ 12 & -12 & 12 & -12 & 12 & -12 & 12 & -12 & 12 & -12 & 12 & -12 & 12 & -12 & 12 & -12 \end{bmatrix}.$$

22. The apparatus according to claim 21, further comprising a quantizing unit configured
  to quantize the output matrix $Z_{16\times16}$ by using a quantization parameter used in the Microsoft Media Video.

23. The apparatus according to claim 22, further comprising a normalizing unit configured to normalize the quantized matrix by using a scaling matrix $K_{16\times16}$, where, $$K_{16\times16} = \frac{1}{2}\begin{bmatrix} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{bmatrix}$$

and where $a = \dfrac{1}{\sqrt{1512}}$, $b = \dfrac{1}{\sqrt{1156}}$ and $c = \dfrac{1}{\sqrt{1168}}$.

24. An apparatus for processing an order-16 transform in image and video coding, comprising:
 a receiving unit configured to receive a data matrix $X_{16\times16}$ to be transformed; and
 a transform unit configured to transform the received data matrix $X_{16\times16}$ with an order-16 transform matrix $E_{16\times16}$ to generate an output matrix $Z_{16\times16}$ by a rule of $Z_{16\times16}=E_{16\times16}X_{16\times16}$,
wherein the transform matrix $E_{16\times16}$ is represented as $$E_{16\times16} = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 8 & -8 & -8 & 8 & 8 & -8 & -8 & 8 & 8 & -8 & -8 & 8 & 8 & -8 & -8 & 8 \\ 10 & -10 & -9 & 9 & 6 & -6 & -2 & 2 & -2 & 2 & 6 & -6 & -9 & 9 & 10 & -10 \\ 10 & -10 & -4 & 4 & -4 & 4 & 10 & -10 & -10 & 10 & 4 & -4 & 4 & -4 & -10 & 10 \\ 9 & -9 & 2 & -2 & -10 & 10 & 6 & -6 & 6 & -6 & -10 & 10 & 2 & -2 & 9 & -9 \\ 8 & -8 & 8 & -8 & -8 & 8 & -8 & 8 & 8 & -8 & 8 & -8 & -8 & 8 & -8 & 8 \\ 6 & -6 & 10 & -10 & 2 & -2 & -9 & 9 & -9 & 9 & 2 & -2 & 10 & -10 & 6 & -6 \\ 4 & -4 & 10 & -10 & 10 & -10 & 4 & -4 & -4 & 4 & -10 & 10 & -10 & 10 & -4 & 4 \\ 2 & -2 & 6 & -6 & 9 & -9 & 10 & -10 & 10 & -10 & 9 & -9 & 6 & -6 & 2 & -2 \end{bmatrix}.$$

25. The apparatus according to claim 24, further comprising a quantizing unit configured to quantize the output matrix $Z_{16\times16}$ by using a quantization parameter used in the Microsoft Media Video.

26. The apparatus according to claim 25, further comprising a normalizing unit configured to normalize the quantized matrix by using a scaling matrix $K_{16\times16}$, where, $$K_{16\times16} = \frac{1}{2}\begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}$$

and where $a = \frac{1}{\sqrt{1512}}$, $b = \frac{1}{\sqrt{1156}}$ and $c = \frac{1}{\sqrt{1168}}$.

* * * * *

UNITED STATES PATENT AND TRADEMARK OFFICE
CERTIFICATE OF CORRECTION

PATENT NO. : 8,175,165 B2
APPLICATION NO. : 12/103676
DATED : May 8, 2012
INVENTOR(S) : Wai Kuen Cham et al.

It is certified that error appears in the above-identified patent and that said Letters Patent is hereby corrected as shown below:

In the drawings, Fig. 2, the boxes should be labeled "Order-8 ICT"

In Equation (6) (col. 4), the bottom row of the transform $E_8$ should read as follows:
  [4 -9 15 -16 16 -15 9 -4]

In Equation (15) (col. 8), the word "where" should not be capitalized.

In claim 3 (col. 12), the equation should read as follows:

$$C_m = \begin{bmatrix} c_{0,m} \\ c_{1,m} \\ \vdots \\ c_{7,m} \\ c_{8,m} \\ c_{9,m} \\ c_{10,m} \\ c_{11,m} \\ c_{12,m} \\ c_{13,m} \\ c_{14,m} \\ c_{15,m} \end{bmatrix} = \begin{bmatrix} x_{0,m} + x_{1,m} \\ x_{2,m} + x_{3,m} \\ \vdots \\ x_{14,m} + x_{15,m} \\ x_{0,m} - x_{1,m} \\ x_{3,m} - x_{2,m} \\ x_{4,m} - x_{5,m} \\ x_{7,m} - x_{6,m} \\ x_{8,m} - x_{9,m} \\ x_{11,m} - x_{10,m} \\ x_{12,m} - x_{13,m} \\ x_{15,m} - x_{14,m} \end{bmatrix}$$

In claims 6, 7, 10, 13, 19, 20, 23, and 26, the definition for "a" should read as follows:

$$a = \frac{1}{\sqrt{1152}}$$

Signed and Sealed this
Fourth Day of September, 2012

David J. Kappos
*Director of the United States Patent and Trademark Office*

CERTIFICATE OF CORRECTION (continued)
U.S. Pat. No. 8,175,165 B2

In claim 11, the equation should read as follows:

$$E_{16 \times 16} = \begin{bmatrix} 12 & 12 & 12 & 12 & 12 & 12 & 12 & 12 & 12 & 12 & 12 & 12 & 12 & 12 & 12 & 12 \\ 16 & 16 & 15 & 15 & 9 & 9 & 4 & 4 & -4 & -4 & -9 & -9 & -15 & -15 & -16 & -16 \\ 16 & 16 & 6 & 6 & -6 & -6 & -16 & -16 & -16 & -16 & -6 & -6 & 6 & 6 & 16 & 16 \\ 15 & 15 & -4 & -4 & -16 & -16 & -9 & -9 & 9 & 9 & 16 & 16 & 4 & 4 & -15 & -15 \\ 12 & 12 & -12 & -12 & -12 & -12 & 12 & 12 & 12 & 12 & -12 & -12 & -12 & -12 & 12 & 12 \\ 9 & 9 & -16 & -16 & 4 & 4 & 15 & 15 & -15 & -15 & -4 & -4 & 16 & 16 & -9 & -9 \\ 6 & 6 & -16 & -16 & 16 & 16 & -6 & -6 & -6 & -6 & 16 & 16 & -16 & -16 & 6 & 6 \\ 4 & 4 & -9 & -9 & 15 & 15 & -16 & -16 & 16 & 16 & -15 & -15 & 9 & 9 & -4 & -4 \\ 12 & -12 & -12 & 12 & 12 & -12 & -12 & 12 & 12 & -12 & -12 & 12 & 12 & -12 & -12 & 12 \\ 16 & -16 & -15 & 15 & 9 & -9 & -4 & 4 & -4 & 4 & 9 & -9 & -15 & 15 & 16 & -16 \\ 16 & -16 & -6 & 6 & 6 & -6 & 16 & -16 & -16 & 16 & -6 & 6 & 6 & -6 & -16 & 16 \\ 15 & -15 & -4 & 4 & -16 & 16 & 9 & -9 & 9 & -9 & -16 & 16 & -4 & 4 & 15 & -15 \\ 12 & -12 & -12 & 12 & -12 & 12 & 12 & -12 & 12 & -12 & -12 & 12 & -12 & 12 & 12 & -12 \\ 9 & -9 & 16 & -16 & -4 & 4 & -15 & 15 & -15 & 15 & -4 & 4 & 16 & -16 & 6 & -6 \\ 6 & -6 & 16 & -16 & 16 & -16 & 6 & -6 & -6 & 6 & -16 & 16 & 16 & -16 & 6 \\ 4 & -4 & 9 & -9 & 15 & -15 & 16 & -16 & 16 & -16 & 15 & -15 & 9 & -9 & 4 & -4 \end{bmatrix}$$

Claim 14, line 51 (approx.) should read as follows:

"and $E_{8 \times 8}$ is a standard order-8 transform used in the standard"

In claim 16, the equation should read as follows:

$$C_m = \begin{bmatrix} c_{0,m} \\ c_{1,m} \\ \vdots \\ c_{7,m} \\ c_{8,m} \\ c_{9,m} \\ c_{10,m} \\ c_{11,m} \\ c_{12,m} \\ c_{13,m} \\ c_{14,m} \\ c_{15,m} \end{bmatrix} = \begin{bmatrix} x_{0,m} + x_{1,m} \\ x_{2,m} + x_{3,m} \\ \vdots \\ x_{14,m} + x_{15,m} \\ x_{0,m} - x_{1,m} \\ x_{3,m} - x_{2,m} \\ x_{4,m} - x_{5,m} \\ x_{7,m} - x_{6,m} \\ x_{8,m} - x_{9,m} \\ x_{11,m} - x_{10,m} \\ x_{12,m} - x_{13,m} \\ x_{15,m} - x_{14,m} \end{bmatrix}$$

Claim 16, line 53 (approx.) should read as follows:

"($i$, $m$)th element of $C_{16 \times 16}$, and $x_{i,m}$ is the ($i$, $m$)th element"